US007035639B2

(12) United States Patent
Obata et al.

(10) Patent No.: US 7,035,639 B2
(45) Date of Patent: Apr. 25, 2006

(54) RADIO CONTROL APPARATUS AND LINK SECURING METHOD

(75) Inventors: Kazunori Obata, Yokosuka (JP); Takaaki Sato, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 438 days.

(21) Appl. No.: 10/346,109

(22) Filed: Jan. 17, 2003

(65) Prior Publication Data

US 2003/0139185 A1 Jul. 24, 2003

(30) Foreign Application Priority Data

Jan. 18, 2002 (JP) ........................... 2002-010599

(51) Int. Cl.
*H04Q 7/20* (2006.01)

(52) U.S. Cl. .................... 455/436; 455/453; 455/456.6; 455/452; 455/450; 370/331; 370/352

(58) Field of Classification Search ................. 455/436, 455/456.6, 453, 452, 522, 437, 450; 370/331, 370/352
See application file for complete search history.

(56) References Cited

U.S. PATENT DOCUMENTS

| | | | |
|---|---|---|---|
| 5,577,047 A | | 11/1996 | Persson et al. |
| 5,923,650 A | | 7/1999 | Chen et al. |
| 5,999,817 A | * | 12/1999 | Posti et al. ................. 455/439 |
| 6,212,368 B1 | | 4/2001 | Ramesh et al. |
| 6,385,454 B1 | * | 5/2002 | Bahl et al. .................. 455/450 |
| 2002/0107026 A1 | * | 8/2002 | Agrawal et al. ............ 455/453 |
| 2002/0181419 A1 | * | 12/2002 | Zhang et al. ................ 370/331 |
| 2002/0187801 A1 | * | 12/2002 | Vanghi ....................... 455/522 |
| 2003/0117977 A1 | * | 6/2003 | Kang .......................... 370/331 |
| 2005/0020273 A1 | * | 1/2005 | Fong et al. .................. 455/453 |

FOREIGN PATENT DOCUMENTS

JP 2001-251658 9/2001

OTHER PUBLICATIONS

Y.–B. Ling, et al., IEEE Transactions on Vehicular Technology, vol. 45, No. 1, XP-000594674, pp. 122–130, "The Sub–Rating Channel Assignment Strategy for PCS Han–Offs", Feb. 1996.

* cited by examiner

*Primary Examiner*—Sonny Trinh
*Assistant Examiner*—Phuoc Doan
(74) *Attorney, Agent, or Firm*—Oblon, Spivak, McClelland, Maier & Neustadt, P.C.

(57) ABSTRACT

A radio control apparatus 10 is provided with a call management system 18 configured so that, when a mobile station in communication with a first base station by a first communication link requests diversity handover with a second base station, the call management system 18 retrieves a potential information rate that is not higher than an information rate of the first communication link and that is highest, from an information rate table 31 storing information about information rates of communication links securable in the second base station under other radio control apparatus; and a link management system 20 configured so that, when the potential information rate is lower than that of the first communication link, the link management system 20 instructs the first base station to change the first communication link to a second communication link communicable at the potential information rate; the call management system 18 requests the other radio control apparatus to secure a third communication link communicable at the potential information rate and to instruct the second base station to perform communication with the mobile station by the third communication link.

8 Claims, 8 Drawing Sheets

RADIO CONTROL APPARATUS AND LINK SECURING METHOD

BACKGROUND OF THE INVENTION

1. Field of the Invention

The present invention relates to a radio control apparatus and a link securing method for securing a communication link between a mobile station and a base station of a handover destination when the mobile station performs handover in a mobile communication system.

2. Related Background Art

In the mobile communication systems adopting the CDMA (Code Division Multiple Access) system, a mobile station simultaneously establishes communications with a base station of a handover source and with a base station of a handover destination on the occasion of handover, so as to perform diversity reception, thereby achieving improvement in communication quality and non-break communication during the handover (for example, refer to Japanese Patent Application Laid-Open No. 2001-251658). This handover technology is called diversity handover and, in general, a communication link is secured as below between the mobile station and the base station of the handover destination.

The mobile station receives pilot channels sent from the respective base stations of the handover source and the handover destination, and requests the diversity handover with inclusion of the base station of the handover destination when a difference between received powers from the two base stations becomes not more than a predetermined threshold.

In response thereto, the radio control apparatus in charge of the base station of the handover destination secures a communication link of the same information rate as the communication link used in communication between the mobile station and the base station of the handover source, for communication between the mobile station and the base station of the handover destination. This is because the information rates of the respective communication links need to be synchronized with each other in the diversity handover However, if there occurs traffic congestion at the base station of the handover destination, the radio control apparatus might fail to secure the foregoing communication link in certain cases. In such cases, the mobile station repeats the request for diversity handover, and the problem of disconnection of communication will arise if no communication link is secured with the base station of the handover destination even after repetitive requests and if migration of the mobile station finally results in the cell of the base station of the handover destination becoming the first cell (a cell where the reception level of the pilot channel is maximum).

SUMMARY OF THE INVENTION

The present invention has been accomplished in view of the above circumstances and an object of the present invention is to provide a radio control apparatus and a link securing method capable of increasing the rate of securing the communication link between the mobile station and the base station of the handover destination when the mobile station performs handover in the mobile communication system.

In order to achieve the above object, a radio control apparatus according to the present invention is a radio control apparatus for achieving diversity handover in accordance with a request, which is sent from a mobile station in communication with a first base station by use of a first communication link, for diversity handover with a second base station, the radio control apparatus comprising: managing means for managing an information rate table in which information about information rates of communication links securable in the second base station is stored; retrieving means for retrieving as a potential information rate a information rate not higher than an information rate of the first communication link, out of the information rates of the securable communication links from the information rate table on the occasion of receiving the request for diversity handover with the second base station from the mobile station; instructing means for instructing the first base station to change the first communication link to a second communication link communicable at the potential information rate when the potential information rate thus retrieved is lower than the information rate of the first communication link; and requesting means for requesting the second base station to perform communication with the mobile station by use of a third communication link communicable at the potential information rate.

In this radio control apparatus, when the mobile station in communication with the first base station by use of the first communication link sends the request for diversity handover with the second base station, the information rate not higher than the information rate of the first communication link out of the information rates of the securable communication links is retrieved as a potential information rate from the information rate table in which the information about the information rates of the communication links securable in the second base station is stored, and the communication link communicable at the potential information rate can be secured as the second communication link for communication between the mobile station and the first base station and as the third communication link for communication between the mobile station and the second base station. Therefore, even if there is no communication link of the same information rate as the information rate of the first communication link in the second base station, the communication link of the information rate which is lower than the information rate of the first communication link can be secured as the third communication link, which can increase the rate of securing the communication link between the mobile station and the second base station of the handover destination. An information rate herein means the speed to perform transmission and reception of data, i.e., the transmission speed.

When the potential information rate is lower than the information rate of the first communication link, the communication link between the mobile station and the first base station is changed to the second communication link and thereafter communication between the mobile station and the second base station is established by the third communication link of the same information rate as that of the second communication link. This makes it feasible to achieve synchronization between the information rates of the respective communication links in the diversity handover by the simple control.

Preferably, information about whether a communication link is securable or not securable at each information rate is stored in the information rate table, and the managing means operates as follows: when it fails to establish communication between the second base station and the mobile station by the third communication link against the request to the second base station by the requesting means, the managing means revises the information rate table to information that a link is not securable at the potential information rate; and after a lapse of a predetermined time since the revise, the managing means again revises the information rate table to information that a link is securable at the potential information rate.

By performing the revise and the re-revise of the information rate table in this way, it is feasible to make the information rate table dynamically reflect the information about the information rates of the communication links securable in the second base station, for example, without performing complicated processing of periodically updating the information about the information rates of communication links securable in the second base station.

In this case, since in the aforementioned information rate table an information rate set as not securable is assumed to be securable after a lapse of a predetermined time since the revise, there can occur such a situation that an information rate higher than the information rate set as not securable is set as securable. However, since a communication link of a high information rate is normally preferentially used, the apparatus is not allowed to secure a communication link of an information rate higher than the information rate set as not securable in practice.

Thus, when the apparatus is configured so that when an information rate set as not securable is present in the information rate table, the retrieving means retrieves as the potential information rate a highest information rate out of information rates lower than a minimum of the information rate set as not securable, and not higher than the information rate of the first communication link, it is feasible to enhance certainty of securing the communication link between the mobile station and the second base station of the handover destination.

When the apparatus is configured so that when an information rate set as not securable is present in the information rate table, and the information rate set as not securable is not higher than the information rate of the first communication link, the retrieving means retrieves as the potential information rate a lowest information rate out of information rates stored in the information rate table, it is feasible to enhance certainty of securing the communication link between the mobile station and the second base station of the handover destination more by the simple control.

Incidentally, the invention directed to the radio control apparatus can be described as follows from the aspect of link securing methods It is noted that these are based on the same technical concept as the invention of the above radio control apparatus and the solution thereof is also based on the same concept as above.

In order to achieve the above object, a link securing method according to the present invention is a link securing method executed in a radio control apparatus for achieving diversity handover in accordance with a request, which is sent from a mobile station in communication with a first base station by use of a first communication link, for diversity handover with a second base station, the radio control apparatus comprising an information rate table in which information about information rates of communication links securable at the second base station is stored, the link securing method comprising: a retrieving step of retrieving as a potential information rate a information rate not higher than an information rate of the first communication link, out of the information rates of the securable communication links from the information rate table on the occasion of receiving the request for diversity handover with the second base station from the mobile station; an instructing step of instructing the first base station to change the first communication link to a second communication link communicable at the potential information rate when the potential information rate thus retrieved is lower than the information rate of the first communication link; and a requesting step of requesting the second base station to perform communication with the mobile station by use of a third communication link communicable at the potential information rate.

Preferably, information about whether a communication link is securable or not securable at each information rate is stored in the information rate table, and the link securing method further comprises: a revising step of, when it fails to establish communication between the second base station and the mobile station by the third communication link against the request to the second base station in the requesting step, revising the information rate table to information that a link is not securable at the potential information rate; and a re-revising step of, after a lapse of a predetermined time since the revise, again revising the information rate table to information that a link is securable at the potential information rate.

In this case, when an information rate set as not securable is present in the information rate table, the retrieving step may be to retrieve as the potential information rate a highest information rate out of information rates lower than a minimum of the information rate set as not securable, and not higher than the information rate of the first communication link.

When an information rate set as not securable is present in the information rate table, and the information rate set as not securable is not higher than the information rate of the first communication link, the retrieving step may be to retrieve as the potential information rate a lowest information rate out of information rates stored in the information rate table.

DESCRIPTION OF THE PREFERRED EMBODIMENTS

The preferred embodiment of the present invention will be described below in detail with reference to the drawings. It is assumed that the CDMA system is adopted in the mobile communication system of the present embodiment.

[Configuration of Mobile Communication System]

Figure 1:
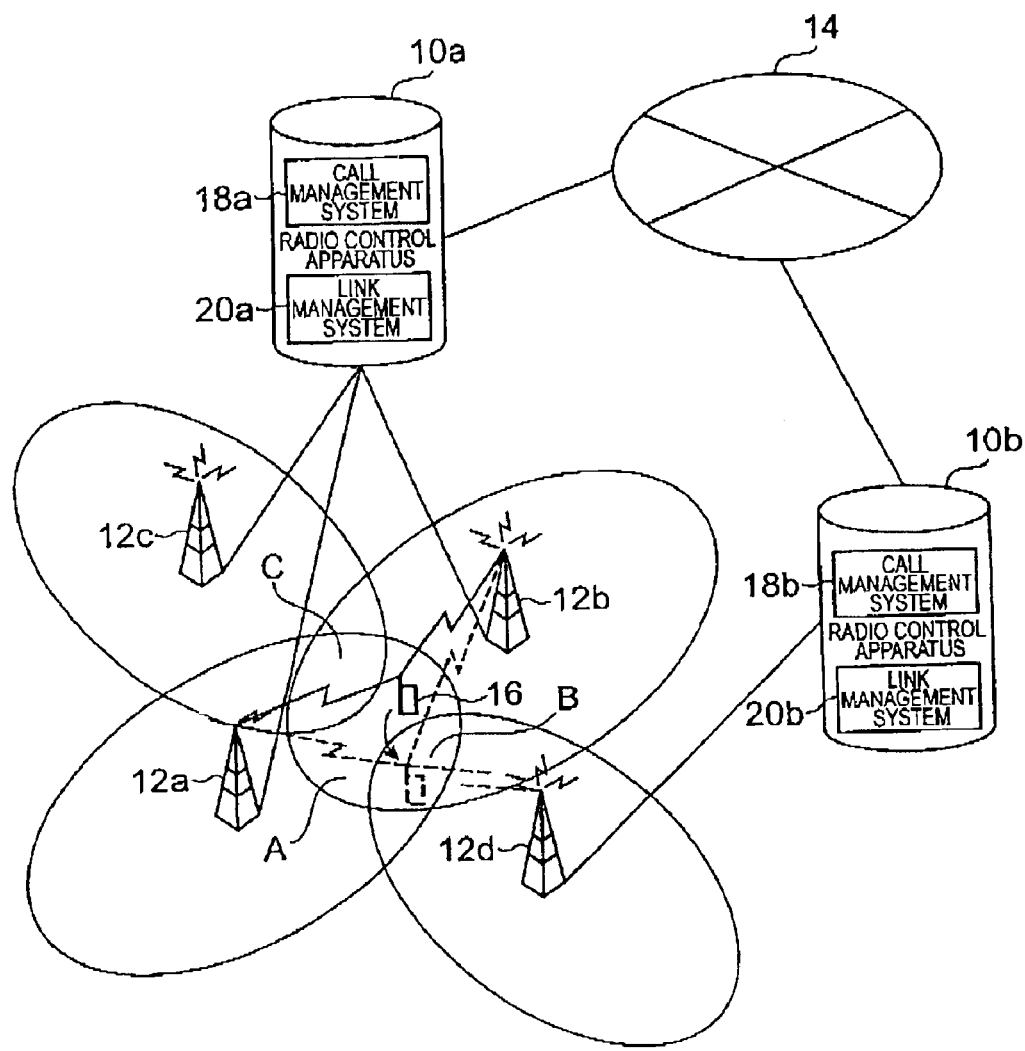
FIG. 1 is a conceptual diagram where the mobile station performs handover across different areas in the mobile communication system.

The configuration of the mobile communication system of the present embodiment will be described with reference to FIG. 1. FIG. 1 is a conceptual diagram where a mobile station performs handover across different areas in the mobile communication system of the present embodiment. An area herein refers to a region comprised of cells of base stations under the control of a single radio control apparatus.

As illustrated, the mobile communication system of the present embodiment is comprised of a plurality of radio control apparatus 10. Each radio control apparatus 10 is wire-connected to at least one base station 12 to control the base station 12 and the apparatus 10 are wire-connected through backbone network 14 to each other.

In the present embodiment, the radio control apparatus 10a controls the base stations 12a, 12b, and 12c, and the radio control apparatus lob controls the base station 12d. Let us define an area in which the cells of the respective base stations 12a and 12b overlap each other and which is not included in each of the cells of the base stations 12c and 12d, as a zone A; an area in which the cells of the respective base stations 12a, 12b, and 12d overlap each other and which is not included in the cell of the base station 12c, as a zone B; and an area in which the cells of the respective base stations 12a, 12b, and 12c overlap each other and which is not included in the cell of the base station 12d, as a zone C.

Each base station 12 establishes communication with a mobile station 16 existing in the cell of its own station, by radio. When the mobile station 16 performs handover with migration between cells of the respective base stations 12, it requests the diversity handover. For example, in the case where the mobile station 16 moves from the zone A to the zone B as shown in FIG. 1, the mobile station 16 receives pilot channels sent from the respective base stations 12a and 12b of handover source and from the base station 12d of a handover destination, and, when a difference between received powers therefrom becomes not more than a predetermined threshold, it requests the diversity handover with inclusion of the base station 12d of the handover destination.

[Configuration of Radio Control Apparatus]

Figure 2:
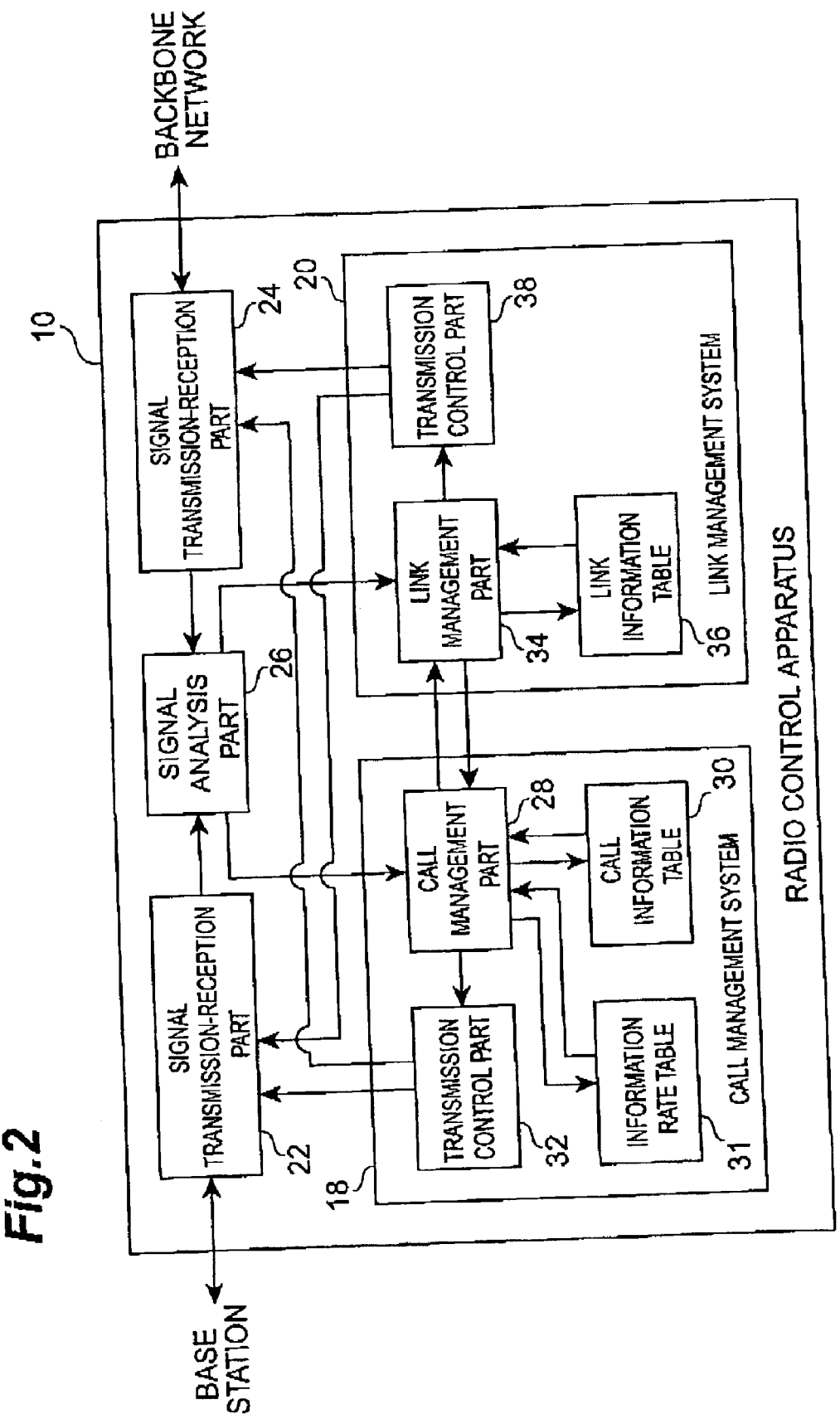
FIG. 2 is a block diagram showing the configuration of the radio control apparatus.

The configuration of the above-stated radio control apparatus 10 will be described with reference to FIG. 2. FIG. 2 is a block diagram showing the configuration of the radio control apparatus 10.

As illustrated, the radio control apparatus 10 is comprised of a call management system 18 for managing calls made by the mobile station 16 through the base station 12 under the control of its own apparatus; a link management system 20 for managing communication links with the mobile station 16 in the base station 12 under the control of its own apparatus; a signal transmission-reception part 22 wire-connected to the base station 12 and configured to perform transmission and reception of signals to and from the base station; a signal transmission-reception part 24 wire-connected to the backbone network 14 and configured to perform transmission and reception of signals to and from another radio control apparatus; and a signal analysis part 26 for analyzing whether signals received by the signal transmission-reception parts 22 and 24 are signals to the call management system 18 or signals to the link management system 20 and for distributing the signals to the respective systems.

Figure 7A:
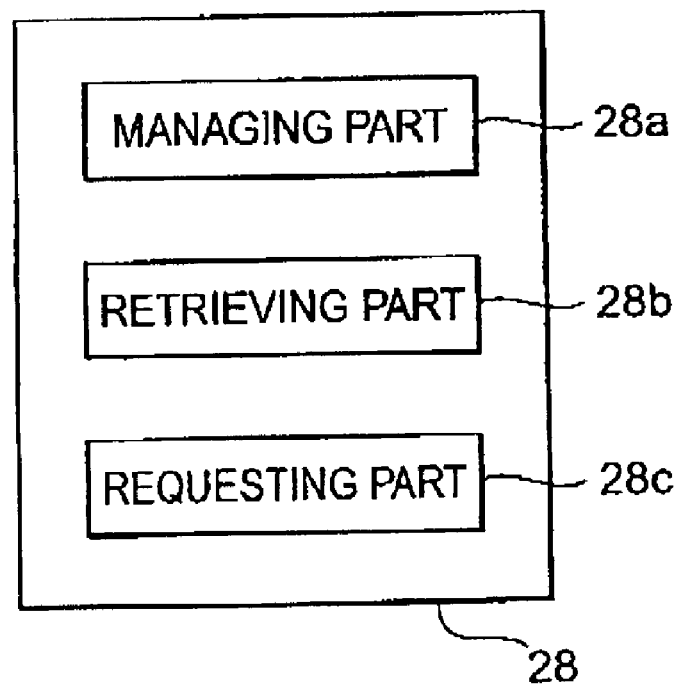
FIG. 7A is a conceptual diagram of the call management part of the radio control apparatus.

The call management system 18 has a call management part 28, a call information table 30, an information rate table 31, and a transmission control part 32. The call management part 28 has a managing part 28a, a retrieving part 28b, and a requesting part 28c (refer to FIG. 7A), and performs reception of signals from the signal analysis part 26, transmission of signals through the transmission control part 32 to the base station 12 and to the other radio control apparatus, and transmission and reception of signals to and from the link management system 20 of the radio control apparatus 10. The transmission control part 32 analyzes whether signals transmitted from the call management part 28 are signals to the base station 12 or signals to the other radio control apparatus, and distributes the signals to the signal transmission-reception parts 22 and 24. The call information table 30 stores call information indicating which communication links of the base station 12 are used by the aforementioned calls, and other information, and the call management part 28 performs addition, change, deletion, etc. of the call information.

Figure 3:
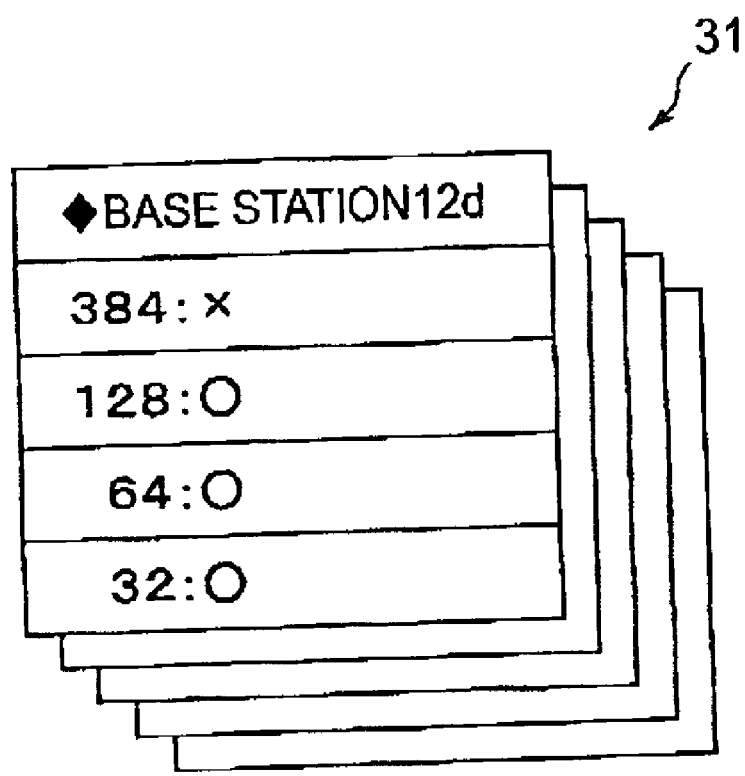
FIG. 3 is a conceptual diagram of the information rate table in the radio control apparatus.

The information rate table 31 of the call management system 18 stores information about information rates of communication links securable in the base station under the control of the other radio control apparatus (i.e., the base station under the control of the other radio control apparatus, to which the mobile station 16 can achieve handover from the base station 12 under the control of the radio control apparatus 10), which is adjacent to the base station 12 under the control of the radio control apparatus 10. The information rate table 31 is subjected to retrieval of information, revise, etc. by the call management part 28, which will be detailed later. FIG. 3 is a conceptual diagram of the information rate table 31 in the radio control apparatus 10a. As illustrated, the information rate table 31 stores information about whether a communication link is securable or not securable at each information rate, for a plurality of base stations as described above, including the base station 12d under the control of the radio control apparatus 10b and others. In the information rate table 31, "384" and other numerals indicate the information rates, and units thereof are (kbps). Furthermore, "o" indicates "securable," and "x" "not securable."

Figure 7B:
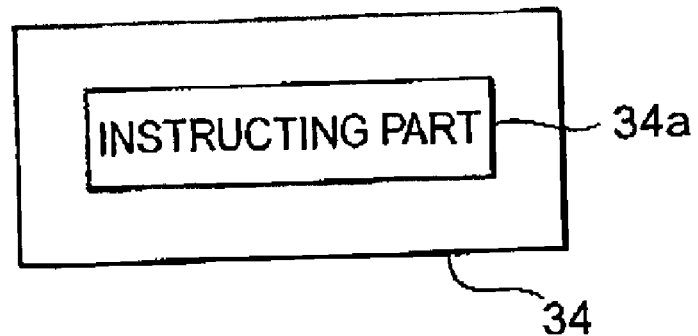
FIG. 7B is a conceptual diagram of the link management part of the radio control apparatus.

The link management system 20 has a link management part 34, a link information table 36, and a transmission control part 38. The link management part 34 has a instructing part 34a (refer to FIG. 7B), and performs reception of signals from the signal analysis part 26, transmission of signals through the transmission control part 38 to the base station 12 and to the other radio control apparatus, and transmission and reception of signals to and from the call management system 18 of the radio control apparatus 10. The transmission control part 38 analyzes whether signals transmitted from the link management part 34 are signals to the base station 12 or signals to the other radio control apparatus, and distributes the signals to the respective signal transmission-reception parts 22 and 24. The link information table 36 stores link information indicating whether each communication link of each base station 12 under the control is used or unused, or the like, and the link management part 34 performs addition, change, deletion, etc. of the link information.

[Operation of Mobile Communication System]

Figure 4:
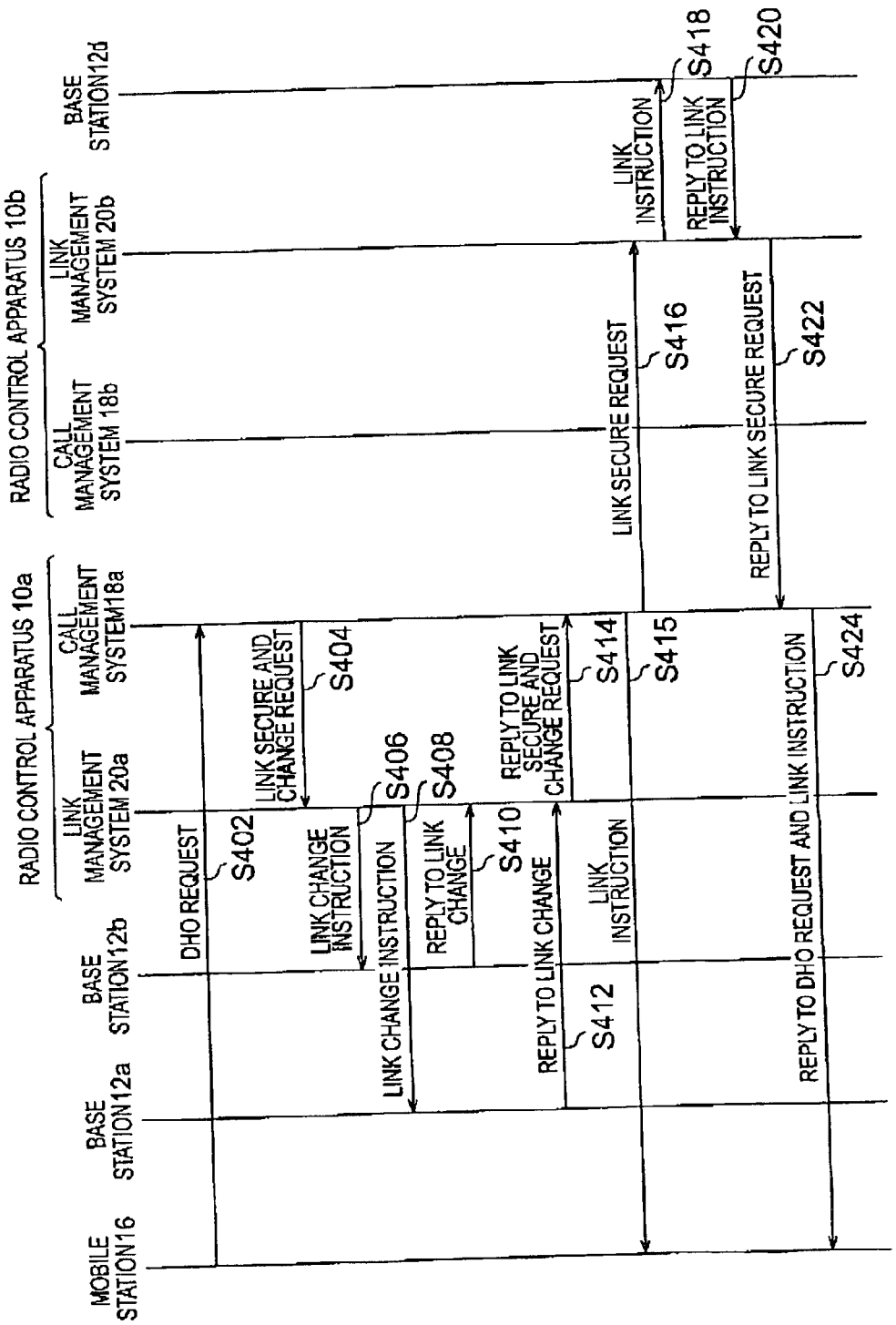
FIG. 4 is a transition diagram showing the operation of the mobile communication system where the mobile station performs handover across different areas.

The following will describe the operation of the mobile communication system in the case where the mobile station 16 moves from the zone A to the zone B and the mobile station 16 requests the diversity handover with the base station 12d in the different area as shown in FIG. 4, with reference to FIG. 4. FIG. 4 is a transition diagram showing the operation of the mobile communication system carried out when the mobile station 16 performs the handover across the different areas.

With movement of the mobile station 16 from the zone A into the zone B, the difference between received powers of the pilot channels sent from the base stations 12a and 12b of the handover source and from the base station 12d of the handover destination becomes not more than the predetermined threshold, whereupon the mobile station 16 sends a request for the diversity handover (denoted by "DHO" in FIG. 4) with inclusion of the base station 12d of the handover destination, to the call management system 18a of the radio control apparatus 10*a* through each of the base stations 12*a* and 12*b* (step S402). This request includes information indicating the information rate of the communication link used in communication between the mobile station 16 and the base stations 12*a* and 12*b* of the handover source (which will be referred to as a "first communication link" in the present operation). It is assumed herein that the information rate of the first communication link is 384 kbps.

In the call management system 18*a*, the retrieving part 28*b* of the call management part 28 retrieves a potential information rate from the information rate table 31 in reply to the request sent in step S402. Supposing here that the information rate table 31 is in the state shown in FIG. 3, the retrieving part 28*b* retrieves as the potential information rate the highest information rate, i.e., 128 kbps out of those lower than the minimum (384 kbps) of the information rate not securable, and not higher than the information rate of the first communication link (384 kbps).

After this retrieval, the call management system 18*a* requests the link management system 20*a* to secure the communication link communicable at 128 kbps (which will be referred to as a "second communication link" in the present operation), for communication between the mobile station 16 and the base stations 12*a* and 12*b* of the handover source and to change the first communication link used in communication with the mobile station 16 by the base stations 12*a* and 12*b*, to the second communication link (step S404).

In reply to this request, the link management system 20*a* (being the instructing part 34*a* of the link management part 34 specifically) secures the second communication link on the basis of the link information of the base stations 12*a* and 12*b* stored in the link information table 36, and instructs each of the base stations 12*a* and 12*b* under the control to change the first communication link used in communication with the mobile station 16, to the second communication link (steps S406 and S408) When the link management system 20*a* receives acknowledgments to the instructions in the steps S406 and S408 from the respective base stations 12*a* and 12*b* (steps S410 and S412), it sends an acknowledgment to the request in the step S404, to the call management system 18*a* (step S414).

After receiving this acknowledgment, the call management system 18*a* instructs the mobile station 16 through each of the base stations 12*a* and 12*b* to use the communication link for each of the base stations 12*a* and 12*b* (step S415). Then the call management system 18*a* (being the requesting part 28*c* of the call management part 28 specifically) requests the link management system 20*b* of the radio control apparatus 10*b* controlling the base station 12*d* of the handover destination, to secure the communication link communicable at 128 kbps (which will be referred to hereinafter as a "third communication link"), for communication between the mobile station 16 and the base station 12*d* and to instruct the base station 12*d* to perform communication with the mobile station 16 by use of the third communication link (step S416).

In response to this request, the link management system 20*b* secures the third communication link on the basis of the link information of the base station 12*d* stored in the link information table 36 and instructs the base station 12*d* to use the third communication link for communication with the mobile station 16 (step S418). When the link management system 20*b* receives an acknowledgment to the instructions in step S418 from the base station 12*d* (step S420), it sends an acknowledgment to the request in step S416, to the call management system 18*a* of the radio control apparatus 10*a* (step S422).

Receiving this acknowledgment, the call management system 18*a* of the radio control apparatus 10*a* sends an acknowledgment to the request in step S402, through each of the base stations 12*a* and 12*b* to the mobile station 16 and provides instructions for the communication line to be used for the base station 12*d* (step S424), and the diversity handover is initiated between the mobile station 16 and the base stations 12*a*, 12*b*, and 12*d*.

The above operation of the mobile communication system may be modified so that the call management system 18*a* of the radio control apparatus 10*a* does not perform the operation in step S415 but simultaneously sends the instructions for the communication links to be used for the respective base stations 12*a*, 12*b*, and 12*d*, through each of the base stations 12*a* and 12*b* to the mobile station 16 in step S424.

The above operation of the mobile communication system was conducted in the case where in the call management system 18*a* of the radio control apparatus 10*a*, the information rate of 128 kbps was retrieved against the first communication link of 384 kbps from the information rate table 31, but the actions in the steps S404 to S414 are not carried out in the case where the information rate of 384 kbps equal to the first communication link of 384 kbps is retrieved. This is because the information rates of the respective communication links need to be synchronized with each other in the diversity handover and the third communication link of the same information rate as the information rate of the first communication link is secured through the actions in the steps S416 to S422.

There can also occur such a situation that the link management system 20*b* of the radio control apparatus 10*b* fails to secure the third communication link for communication between the mobile station 16 and the base station 12*d*, for example, because of change in the information rates of communication links actually securable in the base station 12*d* of the handover destination with respect to the information in the information rate table 31 at the time of the retrieval of the information rate in the call management system 18*a* of the radio control apparatus 10*a*. In this situation, the link management system 20*b* sends a reply of failure in securing the link, to the request in step S416 from the call management system 18*a* of the radio control apparatus 10*a*, and the operation of the mobile communication system is terminated. Then the mobile station 16 will again perform the request for diversity handover after a lapse of a predetermined time since the request for diversity handover in step S402.

In the radio control apparatus 10*a*, as described above, when the mobile station 16 in communication with the base stations 12*a* and 12*b* by use of the first communication link sends the request for diversity handover with inclusion of the base station 12*d* under the control of the other radio control apparatus 10*b*, the call management part 28 in the call management system 18*a* retrieves as a potential information rate the highest information rate not higher than the information rate of the first communication link out of the information rates of communication links securable in the base station 12*d*, from the information rate table 31. As a result, the second communication link communicable at the potential information rate thus retrieved is secured for communication between the mobile station 16 and the base stations 12*a* and 12*b* of the handover source, and the third communication link communicable at the potential information rate thus retrieved is secured for communication between the mobile station 16 and the base station 12*d* of the handover destination. Accordingly, even if the communication link of the same information rate as the information rate of the first communication link is not available in the base station 12d, the communication link of the highest possible information rate is secured as the third communication link, whereby it is feasible to increase the rate of securing the communication link between the mobile station 16 and the base station 12d of the handover destination.

When the potential information rate retrieved from the information rate table 31 is lower than the information rate of the first communication link, the communication link between the mobile station 16 and the base stations 12a and 12b of the handover source is changed to the second communication link and thereafter the communication between the mobile station 16 and the base station 12d of the handover destination is established by the third communication link of the same information rate as that of the second communication link. Namely, prior to adding the third communication link in the diversity handover, the communication link between the mobile station 16 and the base stations 12a and 12b of the handover source is changed to the second communication link of the same information rate as that of the third communication link, whereby it is feasible to readily perform the adding process of the third communication link.

[Processing of Revise and Re-revise of Information Rate Table]

Figure 5:
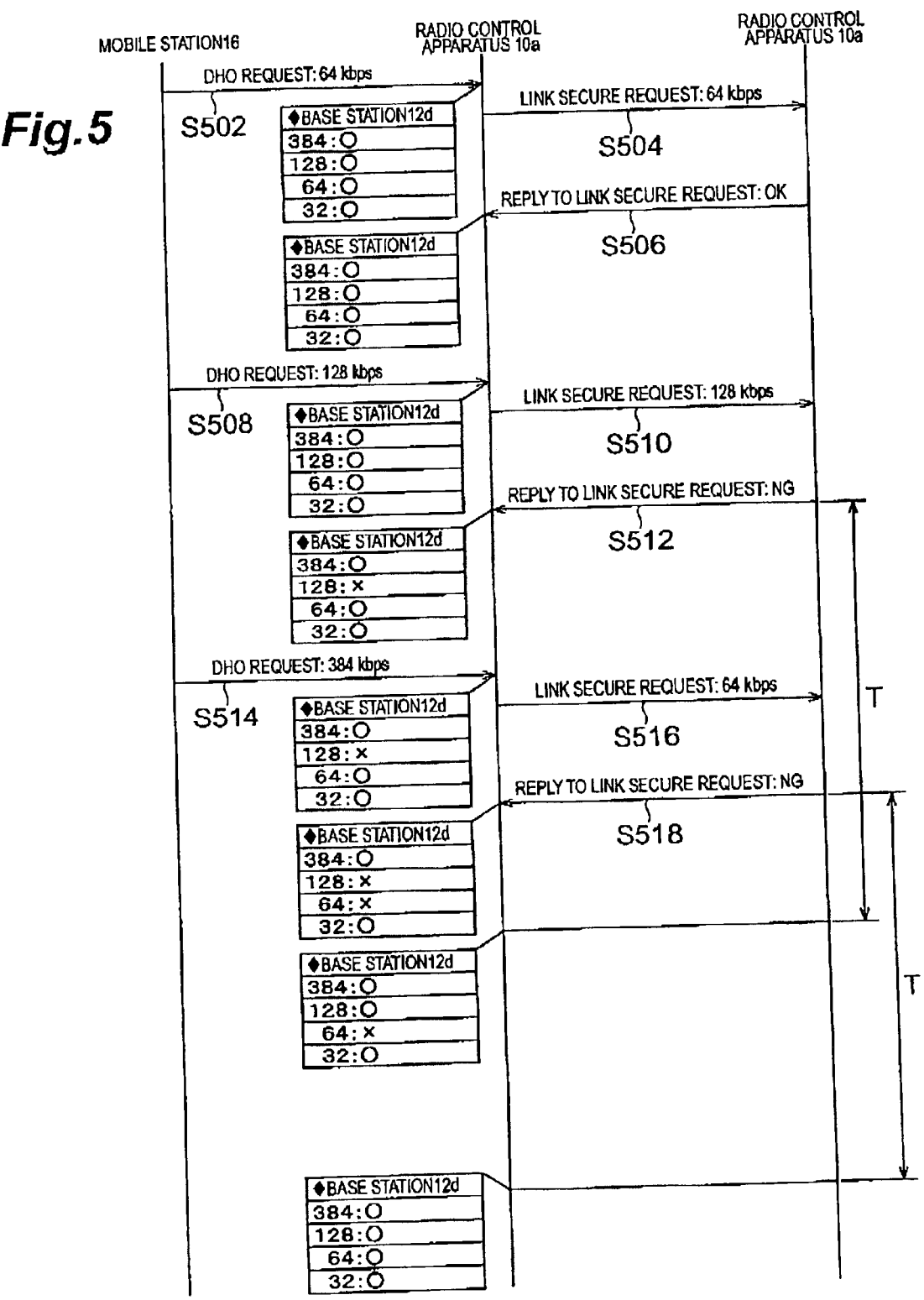
FIG. 5 is a transition diagram showing the processing of revise and re-revise of the information rate table in the radio control apparatus.

The processing of revise and re-revise of the information rate table 31 in the radio control apparatus 10 will be described below with reference to FIG. 5. FIG. 5 is a transition diagram showing the processing of revise and re-revise of the information rate table 31 in the radio control apparatus 10a. The description of the present processing is based on the aforementioned operation of the mobile communication system, and in FIG. 5, "DHO request" corresponds to the action of step S402 in the above operation of the mobile communication system, "communication link secure request" to the action of step S416, and "acknowledgment to communication link secure request" to the action of step S422. The other actions are omitted from the description of the present processing and from the illustration of FIG. 5.

The radio control apparatus 10a receives a request for the diversity handover at 64 kbps (the information rate of the first communication link) with the base station 12d from the mobile station 16 (step S502) and, because there exists no not-securable information rate in the information rate table 31, the retrieving part 28b of the call management part 28 then retrieves the highest information rate not higher than 64 kbps, i.e., 64 kbps as a potential information rate, As a result, the radio control apparatus 10a requests the radio control apparatus 10b to secure the third communication link of 64 kbps (step S504). When this request is accepted, i.e., when the radio control apparatus 10a receives an acknowledgment of success in securing the link (step S506), the information rate table 31 is maintained as it is.

When the radio control apparatus 10a thereafter receives a request for the diversity handover at 128 kbps with the base station 12d from the mobile station 16 (step S508), because there exists no not-securable information rate in the information rate table 31, the retrieving part 28b of the call management part 28 retrieves the highest information rate not higher than 128 kbps, i.e., 128 kbps as a potential information rate. As a result, the radio control apparatus 10a requests the radio control apparatus 10b to secure the third communication link of 128 kbps (step S510). When this request is not accepted, i.e., when the radio control apparatus 10a receives a response of failure in securing the link (step S512), the managing part 28a of the call management part 28 revises the information rate table 31 to information that 128 kbps is not securable. After a lapse of a predetermined time T since the revise, the managing part 28a re-revises the information rate table 31 to information that 128 kbps is securable.

If the radio control apparatus 10a receives a request for the diversity handover at 384 kbps with the base station 12d from the mobile station 16 before the lapse of the predetermined time T since the revise in step S512 (step S514), because there exists a not-securable information rate (128 kbps) in the information rate table 31, the retrieving part 28b of the call management part 28 retrieves the highest information rate out of the information rates lower than the minimum (128 kbps) of the information rate not securable and not higher than the information rate of the first communication link (384 kbps), i.e., 64 kbps as a potential information rate. As a result of this operation, the radio control apparatus 10a requests the radio control apparatus 10b to secure the third communication link of 64 kbps (step S516). When the radio control apparatus 10a receives a reply of NG to this request (step S518), the managing part 28a of the call management part 28 revises the information rate table 31 to information that 64 kbps is not securable. As described above, the managing part 28a re-revises the information rate table 31 to information that 64 kbps is securable, after the lapse of the predetermined time T since the revise.

By performing the revise and re-revise of the information rate table 31 as described above, it is feasible to make the information rate table 31 dynamically reflect the information on the information rates of communication links securable in the base station 12d, for example, without performing the complicated processing of periodically receiving the information on the information rates of communication links securable in the base station 12d under the control of the other radio control apparatus 10b, from the radio control apparatus 10b and updating the information rate table 31 at every reception of information.

In the information rate table 31, since an information rate set as not securable is assumed to be securable after the lapse of the predetermined time since the revise, there can occur a situation where an information rate higher than an information rate set as not securable is set as securable. However, since a communication link of a high information rate is normally preferentially used, the apparatus is not allowed to secure a communication link of an information rate higher than an information rate set as not securable, in practice. However, when there exists an information rate set as not securable in the information rate table 31, the retrieving part 28b of the call management part 28 retrieves as a potential information rate the highest information rate out of the information rates lower than the minimum of the information rate set as not securable and not higher than the information rate of the first communication link, which can improve the certainty of securing the communication link between the mobile station 16 and the base station 12d of the handover destination.

The retrieving part 28b of the call management part 28 may retrieve the potential information rate as follows on the occasion of receiving the request for diversity handover with the base station 12d from the mobile station 16. Namely, when the information rate set as not securable is present in the information rate table 31, and the information rate set as not securable is not higher than the information rate of the first communication link, the retrieving part 28b may retrieve as the potential information rate the lowest information rate (32 kbps) out of information rates stored in the information rate table 31. This makes it feasible to enhance certainty of securing the communication link between the mobile station 16 and the base station 12*d* of the handover destination more by the simple control.

[Other Operation of Mobile Communication System]

Figure 6:
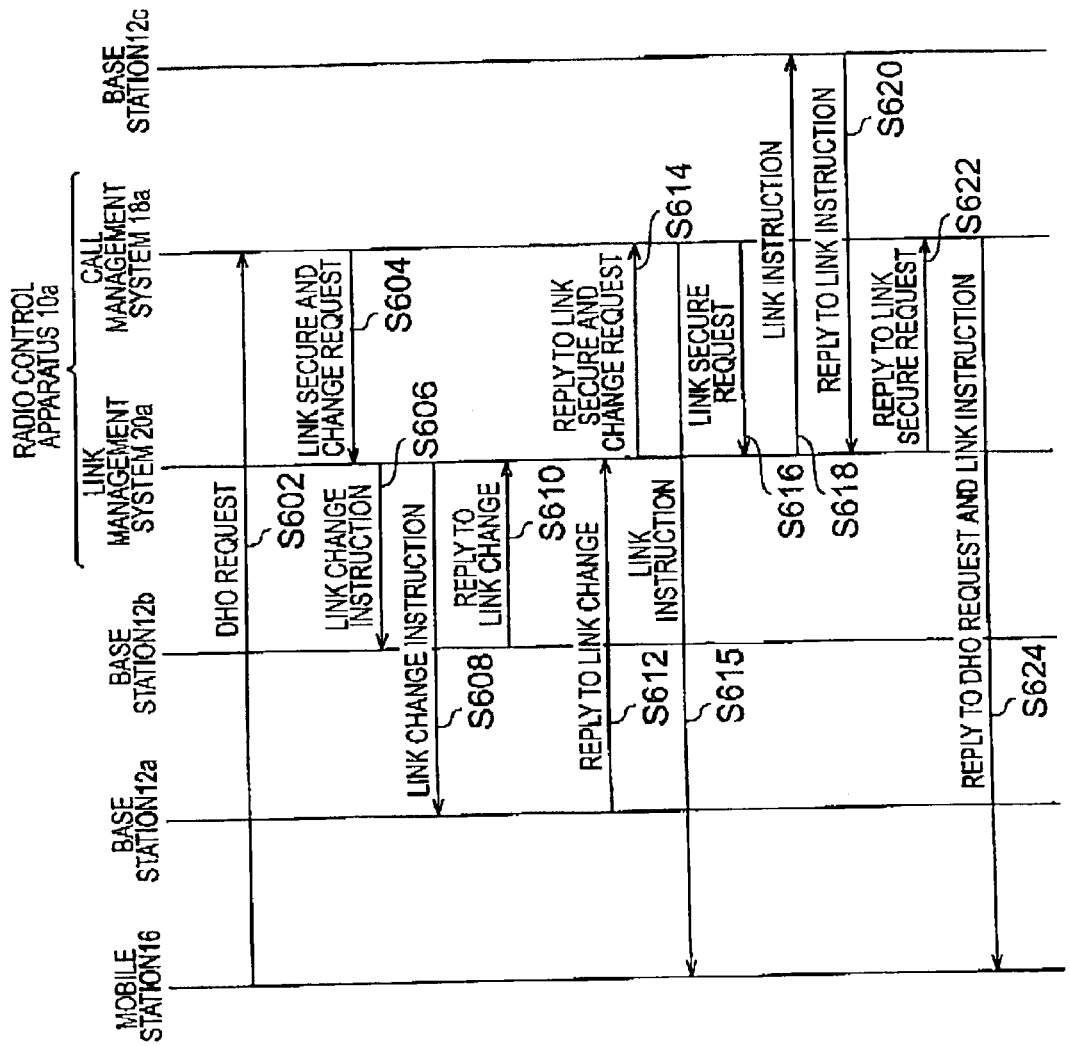
FIG. 6 is a transition diagram showing the operation of the mobile communication system where the mobile station performs handover in the same area.

The mobile communication system of the present embodiment is also applicable to a situation where the mobile station 16 moves from the zone A to the zone C shown in FIG. 1 and where the mobile station 16 requests the diversity handover with the base station 12*c* within the same area. The operation of the mobile communication system in this situation will be described with reference to FIG. 6. FIG. 6 is a transition diagram showing the operation of the mobile communication system where the mobile station 16 performs the handover in the same area.

With movement of the mobile station 16 from the zone A into the zone C, the difference between received powers of the pilot channels received from the base stations 12*a* and 12*b* of the handover source and from the base station 12*c* of the handover destination becomes not more than the predetermined threshold, whereupon the mobile station 16 sends a request for diversity handover ("DHO" in FIG. 6) with inclusion of the base station 12*c* through each of the base stations 12*a* and 12*b* to the call management system 18*a* of the radio control apparatus 10*a* (step S602). This request includes the information indicating the information rate of the communication link used in communication between the mobile station 16 and the base stations 12*a* and 12*b* of the handover source (which will be referred to hereinafter as a "first communication link" in the present operation). It is assumed herein that the information rate of the first communication link is 384 kbps.

In reply to the request in step S602, because the base station 12*c* is under the control of the radio control apparatus 10*a*, the call management system 18*a* retrieves the highest information rate not higher than the information rate of the first communication link from the link information of the base station 12*c* stored in the link information table 36 of the link management system 20*a*. It is assumed herein that the information rate of 128 kbps is retrieved against the first communication link of 384 kbps. As a result, the call management system 18*a* requests the link management system 20*a* to secure a communication link communicable at 128 kbps (which will be referred to hereinafter as a "second communication link" in the present operation) for communication between the mobile station 16 and the base stations 12*a* and 12*b* of the handover source and to change the first communication link used in communication with the mobile station 16 by the base stations 12*a* and 12*b*, to the second communication link (step S604).

In reply to this request, the link management system 20*a* secures the second communication link on the basis of the link information of the base stations 12*a* and 12*b* stored in the link information table 36, and instructs each of the base stations 12*a* and 12*b* under control to change the first communication link used in communication with the mobile station 16, to the second communication link (steps S606 and S608). The link management system 20*a* receives an acknowledgment to the instructions in steps S606 and S608 from each of the base stations 12*a* and 12*b* (steps S610 and S612), and then the link management system 20*a* sends an acknowledgment to the request in step S604, to the call management system 18*a* (step S614).

After receiving this acknowledgment, the call management system 18*a* instructs the mobile station 16 through each of the base stations 12*a* and 12*b* to use the communication link for each of the base stations 12*a* and 12*b* (step S615). Then the call management system 18*a* requests the link management system 20*a* to secure a communication link communicable at 128 kbps (which will be referred to hereinafter as a "third communication link" in the present operation) for communication between the mobile station 16 and the base station 12*c* and to instruct the base station 12*c* to perform communication with the mobile station 16 by use of the third communication link (step S616).

In reply to this request, the link management system 20*a* secures the third communication link on the basis of the link information of the base station 12*c* stored in the link information table 36 and instructs the base station 12*c* to use the third communication link for communication with the mobile station 16 (step S618). When the link management system 20*a* receives an acknowledgment to the instructions in step S618 from the base station 12*c* (step S620), it sends an acknowledgment to the request in step S616 to the call management system 18*a* (step S622).

Receiving this acknowledgment, the call management system 18*a* sends an acknowledgment to the request in step S602 and instructions on the communication link for the base station 12*c* through each of the base stations 12*a* and 12*b* to the mobile station 16 (step S624), and the diversity handover is started between the mobile station 16 and the base stations 12*a*, 12*b*, and 12*c*.

The above operation of the mobile communication system may also be modified so that the call management system 18*a* of the radio control apparatus 10*a* does not perform the action of step S615 and in step S624 the call management system 18*a* simultaneously provides the instructions on the communication link for each of the respective base stations 12*a*, 12*b*, and 12*c* through each of the base stations 12*a* and 12*b* to the mobile station 16. When the call management system 18*a* of the radio control apparatus 10*a* retrieves the information rate of 384 kbps against the first communication link of 384 kbps from the link information table 36 of the link management system 20*a*, the actions of the respective steps S604 to S614 are not carried out. When the link management system 20*a* fails to secure the third communication link for communication between the mobile station 16 and the base station 12*c*, the diversity handover is not implemented for the request in step S602, and the mobile station 16 again makes the request for diversity handover after a lapse of a predetermined time since the request in step S602.

As described above, the present invention has realized the following operation: when the mobile station in communication with the first base station by use of the first communication link requests the diversity handover with the second base station, the information rate not higher than the information rate of the first communication link out of the information rates of securable communication links is retrieved as the potential information rate from the information rate table storing the information about the information rates of communication links securable in the second base station, and the communication link communicable at the information rate thus retrieved is secured as the second communication link for communication between the mobile station and the first base station and as the third communication link for communication between the mobile station and the second base station. Accordingly, even in the case where the communication link of the same information rate as the information rate of the first communication link is not available in the second base station, the communication link of the information rate which is lower than the information rate of the first communication link can be secured as the third communication link, which can increase the rate of securing the communication link between the mobile station and the second base station of the handover destination. Furthermore, it is feasible to enhance the certainty of non-break communication on the occasion of the handover at the mobile station.

When the information rate retrieved from the information rate table is lower than the information rate of the first communication link, the communication link between the mobile station and the first base station is changed to the second communication link and thereafter the communication between the mobile station and the second base station is established by the third communication link of the same information rate as that of the second communication link. This makes it feasible to achieve synchronization between the information rates of the respective communication links in the diversity handover by simple control.

What is claimed is:

1. A radio control apparatus for achieving diversity handover in accordance with a request, which is sent from a mobile station in communication with a first base station by use of a first communication link, for diversity handover with a second base station, said radio control apparatus comprising:

managing means for managing an information rate table in which information about information rates of communication links securable in the second base station is stored;

retrieving means for retrieving as a potential information rate a information rate not higher than an information rate of the first communication link, out of the information rates of the securable communication links from the information rate table on the occasion of receiving the request for diversity handover with the second base station from the mobile station;

instructing means for instructing the first base station to change the first communication link to a second communication link communicable at the potential information rate when the potential information rate thus retrieved is lower than the information rate of the first communication link; and requesting means for requesting the second base station to perform communication with the mobile station by use of a third communication link communicable at the potential information rate.

2. The radio control apparatus according to claim 1, wherein information about whether a communication link is securable or not securable at each information rate is stored in the information rate table, and wherein said managing means operates as follows:

when it fails to establish communication between the second base station and the mobile station by the third communication link against the request to the second base station by the requesting means, the managing means revises the information rate table to information that a link is not securable at the potential information rate; and after a lapse of a predetermined time since the revise, the managing means again revises the information rate table to information that a link is securable at the potential information rate.

3. The radio control apparatus according to claim 2, wherein, when an information rate set as not securable is present in the information rate table, the retrieving means retrieves as the potential information rate a highest information rate out of information rates lower than a minimum of the information rate set as not securable, and not higher than the information rate of the first communication link.

4. The radio control apparatus according to claim 2, wherein, when an information rate set as not securable is present in the information rate table, and the information rate set as not securable is not higher than the information rate of the first communication link, the retrieving means retrieves as the potential information rate a lowest information rate out of information rates stored in the information rate table.

5. A link securing method executed in a radio control apparatus for achieving diversity handover in accordance with a request, which is sent from a mobile station in communication with a first base station by use of a first communication link, for diversity handover with a second base station, said radio control apparatus comprising an information rate table in which information about information rates of communication links securable at the second base station is stored, said link securing method comprising:

a retrieving step of retrieving as a potential information rate a information rate not higher than an information rate of the first communication link, out of the information rates of the securable communication links from the information rate table on the occasion of receiving the request for diversity handover with the second base station from the mobile station;

an instructing step of instructing the first base station to change the first communication link to a second communication link communicable at the potential information rate when the potential information rate thus retrieved is lower than the information rate of the first communication link; and a requesting step of requesting the second base station to perform communication with the mobile station by use of a third communication link communicable at the potential information rate.

6. The link securing method according to claim 5, wherein information about whether a communication link is securable or not securable at each information rate is stored in the information rate table, said link securing method further comprising:

a revising step of, when it fails to establish communication between the second base station and the mobile station by the third communication link against the request to the second base station in the requesting step, revising the information rate table to information that a link is not securable at the potential information rate; and a re-revising step of, after a lapse of a predetermined time since the revise, again revising the information rate table to information that a link is securable at the potential information rate.

7. The link securing method according to claim 6, wherein, when an information rate set as not securable is present in the information rate table, the retrieving step is to retrieve as the potential information rate a highest information rate out of information rates lower than a minimum of the information rate set as not securable, and not higher than the information rate of the first communication link.

8. The link securing method according to claim 6, wherein, when an information rate set as not securable is present in the information rate table, and the information rate set as not securable is not higher than the information rate of the first communication link, the retrieving step is to retrieve as the potential information rate a lowest information rate out of information rates stored in the information rate table.

* * * * *